Figure 1:
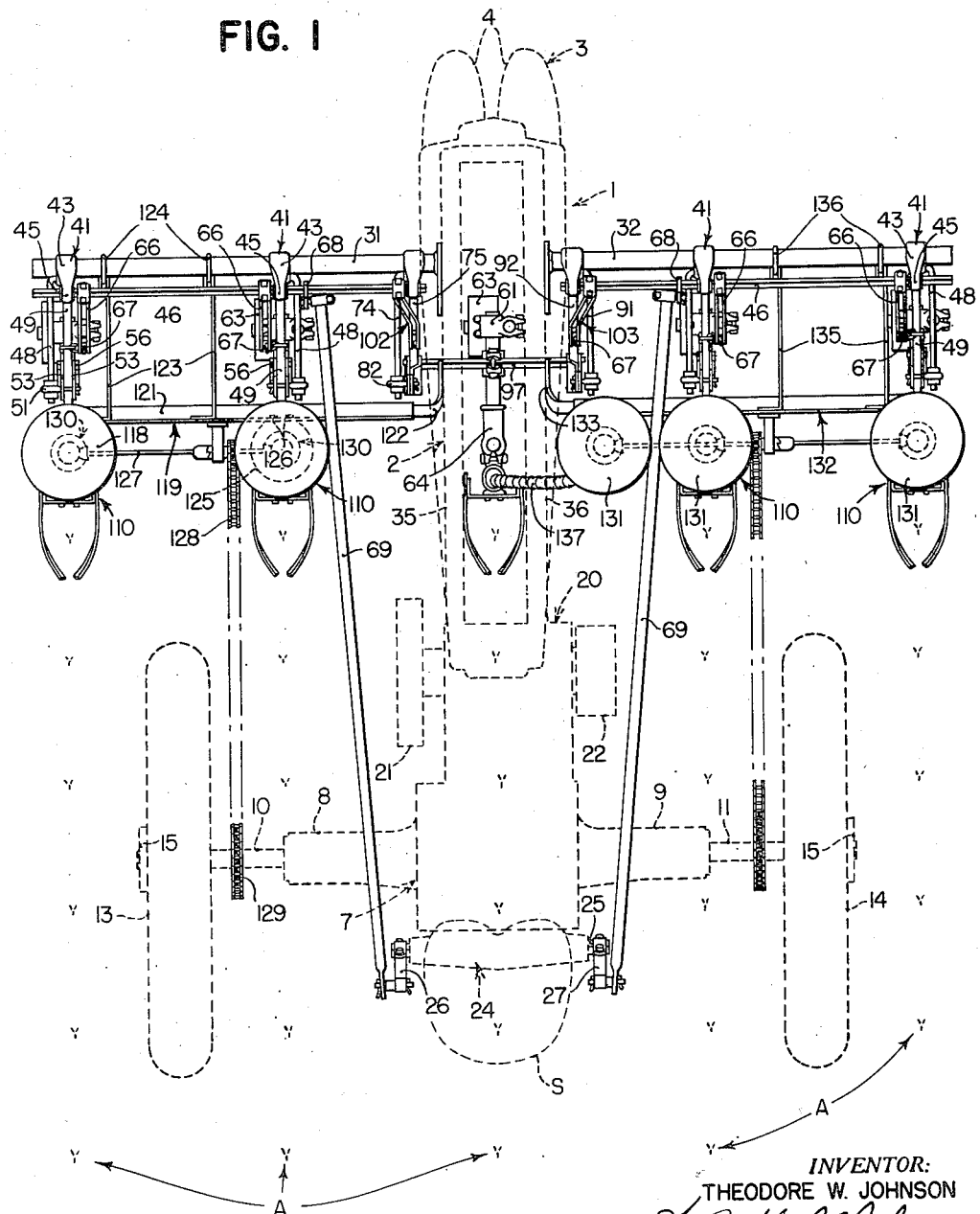

INVENTOR:
THEODORE W. JOHNSON
ATTORNEYS.

Dec. 28, 1943.   T. W. JOHNSON   2,337,662
AGRICULTURAL IMPLEMENT
Filed Nov. 6, 1940   3 Sheets-Sheet 3

INVENTOR:
THEODORE W. JOHNSON
BY
ATTORNEYS.

Patented Dec. 28, 1943

2,337,662

UNITED STATES PATENT OFFICE 2,337,662

AGRICULTURAL IMPLEMENT

Theodore W. Johnson, Moline, Ill., assignor to Deere & Company, Moline, Ill., a corporation of Illinois Application November 6, 1940, Serial No. 364,515

14 Claims. (Cl. 111—52)

The present invention relates generally to agricultural machines and more particularly to implements for planting and cultivating row crops.

The object and general nature of the present invention is the provision of an agricultural implement that is particularly adapted for power farming and either planting or cultivating a plurality of rows, preferably by the simple expedient of attaching the proper tools according to whether it is desired to plant or to cultivate, using the major portion of the outfit common for both operations. A further and important feature of this invention is the provision of an agricultural machine which plants an odd number of rows, say three or five, and which, by the substitution of suitable cultivating tools, cultivates a like number of middles, that is, three or five. A further feature is the provision of an agricultural machine of this kind in which, for both planting and cultivating, the several tool units are arranged in transverse alignment. An additional feature of this invention is the provision of an implement which is particularly adapted for use with a tractor of the tricycle type in which the change from planting to cultivating, and vice versa, can be made without disturbing the frame and rig arrangement.

More particularly, it is a feature of this invention to provide means connecting all of the tools near the front of the tractor so as to afford the operator full vision at all times of the work being done, and it is a further feature of this invention to provide means arranging the tools so that the rear wheels will neither pass over the planted seed, if the outfit is arranged for planting, nor over the row of plants, if the outfit is arranged for cultivating.

Another feature of this invention is the provision of an agricultural machine of this kind, operating on several rows at one time and associated with or supported on a farm tractor, which is balanced laterally so that one side of the machine is not heavier than the other.

Still further, another feature of this invention is the provision of means whereby the change from planting to cultivating units can be made without disturbing or changing the spacing between the tools or the points of connection with the tractor. Specifically, it is a feature of this invention to provide means whereby the planting tools are spaced in the same relation, both with respect to each other and to the tractor as the cultivating tools, whereby common connections may be had for both sets of units and so that there will ordinarily be no requirement that the tool setting on the tractor be changed, unless of course it is desired to change the row spacing, in which case such change will therefore suffice both for the planting operation and any subsequent cultivating operations for that field.

According to the present invention, the above desiderata are realized by an arrangement in which the center tool, both when planting and when cultivating, is disposed in transverse alignment with the laterally outer tools and directly behind the front wheel or wheels of the tractor.

A further feature of this invention in this connection is the provision of new and improved means whereby the center tool may be connected so as to have floating movement relative to the tractor and independent of the other tools, whereby the planting or cultivating can be done at a uniform depth irrespective of irregularities in the ground surface. Also, it is a feature of this invention to provide means whereby the center tool may be raised into and out of transport position without interference with adjacent parts of the tractor, while yet accommodating the independent movement of the center tool with respect to the other tools, which are also mounted for independent vertical movement, all tools being in transverse alignment, as mentioned above.

Another feature of this invention is the provision of attaching connections for the various tools which are common to both the planting and cultivating units, and which common connections include a gauge wheel for each unit, the same gauge wheel being used irrespective of whether the unit is a planting unit or a cultivating unit.

These and other objects and advantages of the present invention will be apparent to those skilled in the art after a consideration of the following detailed description, taken in conjunction with the accompanying drawings illustrating the preferred construction.

Figure 2:
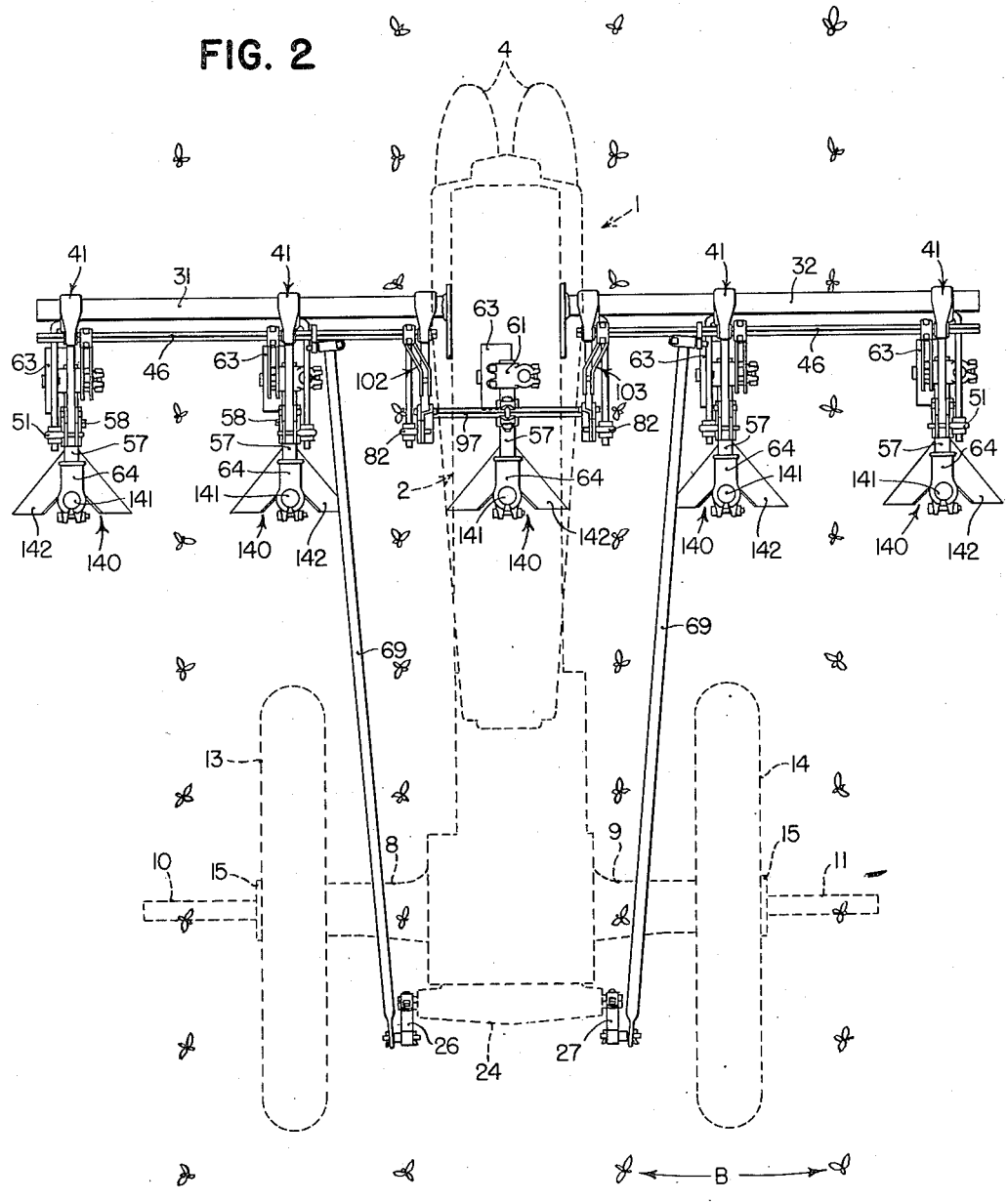
Figure 3:
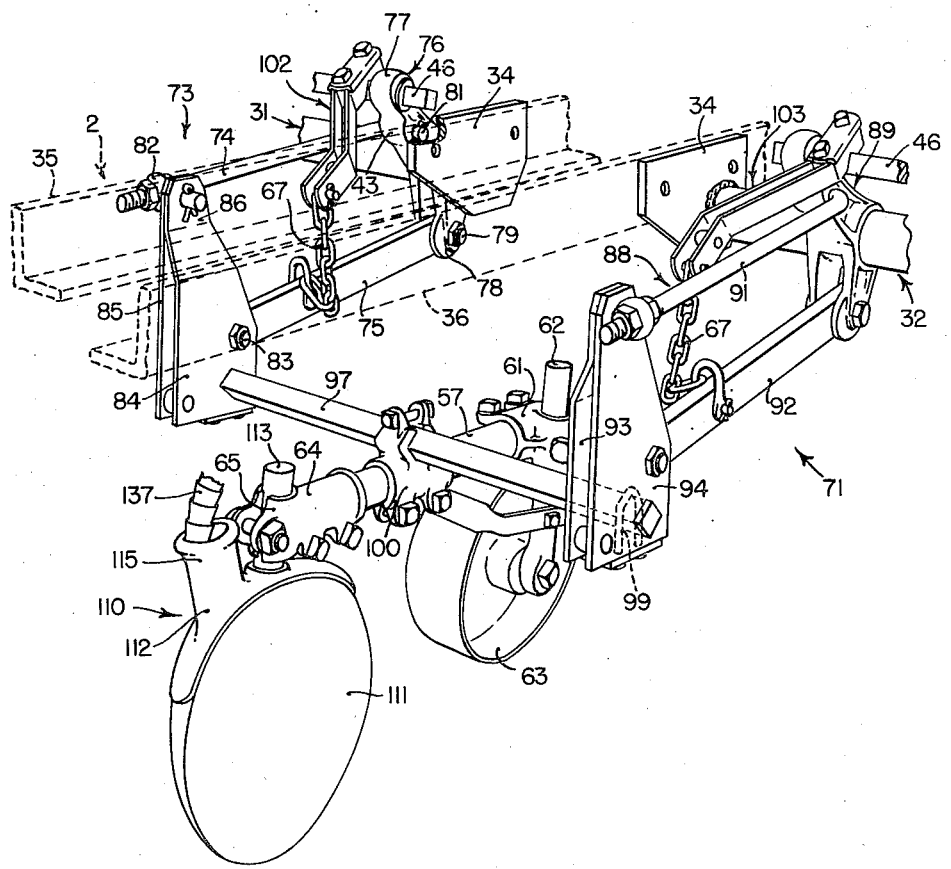

In the drawings:

Figure 1 is a plan view of an agricultural machine in which the principles of the present invention have been incorporated, utilizing planting units and arranged to plant five rows;

Figure 2 is a plan veiw of the implement shown in Figure 1, with cultivating units substituted for the planting units, the machine being arranged to cultivate five middles; and Figure 3 is a perspective view illustrating the construction of the center tool supporting means and also showing the planting tool mounted in place on the tool supporting means, together with a seed can supported on the tractor in a position to deliver seed to the central planting unit.

Referring now more particularly to Figures 1 and 2, the agricultural machine of the present invention comprises a farm tractor of the three-wheel or tricycle type, indicated generally by the reference numeral 1. The tractor 1 includes a generally longitudinally disposed frame 2, the front end of which is supported on front wheel means 3. The latter may take the form of a pair of closely arranged wheels 4 or a single wheel, or any other suitable supporting means disposed in the center of the tractor. The rear portion of the tractor includes a rear axle housing 7 with axle housing extensions 8 and 9 in which axle shafts 10 and 11 are journaled for rotation. The axle shafts 10 and 11 extend laterally outwardly beyond the ends of the axle housings 8 and 9 and receive rear traction wheels 13 and 14. The rear wheels are arranged to be adjustable laterally on the axle shafts 10 and 11 for at least a distance equal to one-half the row spacing. The length of each axle shaft is therefore adequate to secure this extent of adjustment, and the means for adjustably fixing each rear wheel to the associated axle shaft may take any suitable form. Preferably, however, the means for slidably and adjustably mounting the wheels 13 and 14 on the axle shafts 10 and 11 is similar to the adjustable mounting disclosed in Patent No. 2,094,871, dated October 5, 1937, to Theophilus Brown, to which reference may be had if necessary. In Figure 1 such adjustable wheel mounting means is indicated by the reference numeral 15.

The motor of the tractor 1 is indicated in Figure 1 by the reference numeral 20 and includes a flywheel 21 mounted at one side of the tractor body and a power takeoff pulley 22 disposed at the other side. The motor 20, through suitable connections, actuates a power lift 24, which power lift includes a rock shaft 25 and a pair of arms 26 and 27 arranged, in the present instance, for simultaneous rocking movement in a generally fore and aft direction.

The tractor 1 adjacent its forward end carries two laterally outwardly disposed draft bars 31 and 32. These draft bars or draft transmitting members are substantially identical except that one is a right-hand part and the other a left-hand part. Each preferably is in the form of a pipe member, and secured, as by welding, to the inner end of each draft bar is an attaching plate 34 apertured or otherwise formed. By this means the draft bars are bolted, respectively, to the two frame bars 35 and 36, which form a part of the tractor frame 2, and extend laterally outwardly therefrom. The draft bars 31 and 32 thus provide means by which tools may be connected with the tractor in draft transmitting relation.

According to the present invention, I provide means whereby the agricultural machine may be operated as a five-row planter or as a five-row cultivator, and to this end I provide suitable tool supporting means to which either planting tools or cultivating tools may be attached. To provide a five-row machine I prefer to mount the tools so that one is always directly behind the front wheel means, with the others spaced laterally outwardly therefrom but in transverse alignment. This disposes all of the tools in a line across the machine and disposes them between the front and rear wheels where the operator has an excellent view of all operations from the operator's station or seat S on the tractor. The tool supporting means for each of the two laterally outer units are identical except that certain parts may be right-hand and other parts corresponding thereto may be left-hand.

Each of the two supporting means for the laterally outer units includes a bracket 41 having a central sleeve section by which the bracket is supported on the associated tool bar, 31 or 32, and the bracket 41 includes upwardly and downwardly extending link receiving sections 43 and 44. The upper sections 43 are extended to provide bearings 45 in which a rock shaft 46 is disposed. Associated with each bracket 41 is a pair of links 48 and 49, one disposed above the other and extending generally rearwardly from the associated bracket. The upper link 48 is in the form of a rod having its forward end turned laterally inwardly and secured for rocking movement in an opening in the bracket section 43. The rear end of the link 48 is threaded and carries a pair of lock nuts between which the eye of a pivot pin or bolt 51 is adjustably received. The lower link 49 is preferably in the form of a strap or bar pivotally connected with the lower bracket section 44, which preferably is in the form of a bifurcated section between the two parts of which the forward end of the lower link 49 is received and restrained against lateral movement. Pivotally connected with the rear ends of each pair of links 48 and 49 is bracket means in the form of a pair of plates 53 which are disposed in vertical planes and spaced apart so as to receive the rear end of the lower link 49 therebetween. The link 49 is pivotally connected with the plates 53 by a pivot member 54, and the upper portions of the plates 53 are apertured to receive the pivot pin 51 mentioned above. The lower portions of the bracket plates 53 are extended downwardly and curved to provide a socket 56 in which a longitudinally extending tool bar or rig bar 57 is disposed. Bolts 58 serve to fix the rig beam 57 to the bracket plates 53. A socket casting 61 is clamped to the forward end of each rig beam 57 and receives a shank 62 on the lower end of which a gauge wheel 63 is journaled. The rear end of each rig beam 57 is adapted to receive an operating tool, such as a planter or cultivator unit, and to this end, a tool receiving socket casting 64 is fixed to the rear end of each rig beam 57 and is provided with a tool shank receiving sleeve section 65. The rock shaft 46 carries an outer pair of lifting arms 66 of any suitable construction which are connected by chains 67 to the lower links 49, respectively, of the two laterally outer tool supporting means. Fixed to the rock shaft 46 is an upper arm 68, and pivotally connected to the latter is a lifting pipe 69 that extends longitudinally rearwardly from the arm 68 to the associated power lift arm 26 or 27. From Figure 1 it will be seen that the lifting connections 42 for the two laterally outer units at each side of the tractor are of substantially the same construction.

The center tool supporting means, that is, the one that is carried underneath the tractor frame and substantially directly behind the front wheels 4, is of special construction and will now be described. The tool supporting means for the center tool is indicated in its entirety by the reference numeral 71 and, as best shown in Figure 3, comprises two link units 73 and 88, preferably of substantially identical construction to the links 48, 49 described above. The link unit 73 includes a rod member 74 similar to the upper link 48 described above, and the lower link of the link unit 73 comprises a bar or strap member 75 substantially identical with the lower link member 49 described above. The left-hand link means 73 is connected with the left-hand tool bar 31 by a bracket 76 which preferably is identical with the bracket 41, embodying an upper section 77 and a lower bifurcated section 78, the latter receiving the forward end of the lower link 75. A pivot 79 connects the forward end of the link 75 to the bracket 76, and the forward end of the upper link 74 is bent laterally, as at 81, and is rockably received in a bearing opening formed in the upper part 77 of the bracket 76. The rear ends of the upper and lower links 74 and 75 are pivotally connected, as by an eye pin 82 and a pivot 83, to a pair of bracket plates 84 and 85, the plates being spaced apart and receiving the rear end of the lower link 75. The upper portion of the laterally inner bracket plate 84 is offset laterally outwardly so as to dispose the upper section, indicated at 86, against the adjacent portion of the outer bracket plate 85, whereby the clearance between the upper portions of the bracket plates 84 and 85 and the side of the tractor is increased.

A right-hand link means, indicated in its entirety by the reference numeral 88, is of substantially the same construction as the link means 73 just described. A bracket 89 is mounted on the right-hand draft bar 32 closely adjacent the attaching plate 34 thereof in substantially the same way that the left-hand bracket 76 is mounted on the left-hand tool bar 31 closely adjacent the attaching plate 34 of the left-hand tool bar. Upper and lower links 91 and 92 are pivoted to the upper and lower portions of the bracket 89 and at their rear ends are pivotally connected with a pair of spaced apart bracket plates 93 and 94. The laterally inner bracket plate 93 is formed with its upper end laterally offset so as to provide clearance between the bracket plates and the side of the tractor.

The lower portions of the two sets of bracket plates 84, 85 and 93, 94 are provided with transverse polygonal openings, preferably square openings, in which a cross bar 97 is disposed. The cross bar 97 is clamped at its ends in the brackets 84, 85 and 93, 94 by any suitable means, such as a pair of U-bolts 98 and 99. By virtue of the cross bar 97, it will be seen that the two sets of links 73 and 88 move together and serve as parts of the central tool supporting means. The latter also includes a longitudinal rig beam 57 secured to the cross arm 97 by a cross arm clamp 100. A gauge wheel 63 is connected to the forward end of the central rig beam 57 by a clamp 61, and a tool receiving clamp 64 is fixed to the rear end of the central rig beam 57, the same as the outer units.

Referring particularly to the central tool supporting means, the latter is raised and lowered in substantially the same way the laterally outer tool supporting means is raised and lowered, namely, by a pair of lifting chains extending downwardly, respectively, from a pair of lifting arms 102 and 103 that are fixed to the inner ends of the rock shafts 46 to which the lifting arms 66 are fixed, as described above. It will be seen that the center tool will therefore be raised and lowered by tool lifting arms, one on the left-hand rock shaft 46 and the other on the right-hand rock shaft 46. Both rock shafts are rocked together by the lifting pipes 69 and their connection to the power lift arms 26 and 27.

It will also be noted that the links 74, 75 and 91, 92 are substantially the same length as the links 48, 49 of the laterally outer tool supporting means. In fact, all of the upper and lower links may be respectively identical parts. By having all links of substantially the same length and by arranging them in the same way, each tool is carried for generally vertical floating movement by substantially identical connections whereby the movement of one tool may follow along the same line as the movement of each of the other tools.

The tool supporting means and the other parts described above are adapted to receive either planting or cultivating tools. The structure described above, therefore, is common for both planting and cultivating operations. This materially reduces the cost to the farmer and provides an implement which may readily be changed from a planter to a cultivator, and vice versa. Figures 1 and 3 show the machine arranged as a planter, and when arranged in this manner the machine includes five planting units, together with suitable seed containers mounted on the tractor.

Referring now more particularly to Figures 1 and 3, the planting mechanism to be associated with the implement described above, comprises two pairs of outer planting units, each preferably being identical with the others and indicated by the reference numeral 110. Each of these planting units includes a double disk furrow opener 111 supported for rotation at the lower end of a boot casting 112. The latter is carried on or provided with a vertical shank 113 which is received by and clamped to the clamp casting that is carried at the rear end of the rig beam 57. The boot casting 112 includes the boot proper, indicated at 115, into which seed is delivered for deposition in the furrow opened by the disks 111. The central planting unit, that is to be carried by the two centrally disposed link units 73 and 88, is of substantially the same construction as just described, embodying a double disk furrow opener 111, the shank 113 of which is received in the vertical section of the clamp casting fixed to the rear end of the central rig beam 57.

The five planting units 110 receive seed from five seed cans 118 which are supported on the tractor, preferably two on one side and three on the other side thereof, as best shown in Figure 1. For the two seed cans on the left side of the tractor I provide a supporting framework, indicated in its entirety by the reference numeral 119, and which includes a laterally outwardly extending angle iron 121 fixed at its inner end by a curved bracket 122 to the side of the tractor. A pair of braces 123 are connected at their rear and upper ends to the outer end of the angle iron 121 and extend downwardly and forwardly and are fixed to the draft bar 31 by U-bolts 124. Each seed can includes suitable seed selecting mechanism and is carried on a supporting base or bracket 125 which is bolted, as at 126, to the angle iron 121. The seed selecting mechanism of the two cans 118 at the left side of the tractor, are driven by a seeding shaft 127 which is operated by a sprocket chain 128 extending over a driving sprocket 129 fixed to the left axle shaft 10. A seed tube 127 leads downwardly from each seed can 118 to the boot 115 of the associated furrow opener. The seeding shaft 127 drives the seeding mechanism through suitable gearing. The seeding mechanism and gearing, which are of conventional construction, are indicated in Figure 1 by the reference numeral 130. The right hand seed cans include seeding mechanism and driving means therefor of like construction.

The three seed cans at the right side of the machine are each indicated by the reference numeral 131. Preferably, however, the seed cans 131 are identical with the seed cans 118 on the left side of the machine, and the two laterally outer seed cans 131 are supported in substantially the same manner, namely, by a laterally outwardly extending angle iron 132 bolted at its inner end to a curved bracket 133, the latter being bolted to the side of the tractor. The outer end of the angle iron 132 is reenforced by a pair of braces 135 which are bolted at their rear ends to the angle iron 132 and at their forward ends to the right-hand draft bar 32, as by U-bolts 136.

It will be seen particularly from Figure 1 that the seed can 131 for the central planting unit is fixed to the angle iron 132 closely adjacent the bracket 133, and hence the laterally inner can 131 is closely adjacent to the tractor side so as to interfere with the vision of the operator the least possible amount. A seed tube 137 leads downwardly from the intermediate seed can to the central planting unit 110.

From Figure 1 it will be seen that when the machine is arranged as a planter, planting five rows at a time, the central planting unit is disposed directly rearwardly of the front wheel, while the rear wheels of the tractor are arranged to pass down between the rows of seed planted by the two left-hand planting units 110 and the two laterally outer planting units 110 at the right side of the machine. Thus, the rear tractor wheels 13 and 14 do not pass over any of the planted seed. The five rows of planted seed are indicated in Figure 1 by the reference character A.

After the crop has come up and it is desired to cultivate, the machine may be arranged as a cultivator by taking off the planting units and installing cultivator units in their stead. It is a feature of this invention to utilize for this purpose as many common parts as possible, thus not only reducing the cost of the two machines, i. e., the cultivator and the planter, but also to make the change as easily and conveniently as possible. The planting units are readily removable by removing the seed cans and the seed can supporting frames 119 and 132. Lastly, the clamp castings 64 at the rear ends of the rig beams 57 are loosened so that the shanks 113 can be detached from the clamps 64. The next step is to install cultivator tools in place of the planting tools which were removed. According to the principles of the present invention, any suitable cultivating tools may be used. Preferably, each cultivator tool, indicated in Figure 2 by the reference numeral 140, includes a shank 141 to the lower end of which suitable tool means, such as a sweep 142, is fixed. Each shank 141 fits in the tool receiving crank casting 64 on the rear end of each rig beam 57. The cultivator shanks 141 are therefore approximately the same size as the planting shanks 113. It will be noted that the gauge wheels 63 and the lifting and lowering connections are used both for planting and cultivating. Since the crop cultivated is normally the crop that was planted by the machine arranged as shown in Figure 1, the spacing of the tool receiving supports remains the same when cultivating as well as when planting. While the spacing of the tools remains the same, both when planting as well as cultivating, the relation of the tractor supporting wheels to the ground is not the same for these two operations. As shown in Figure 1, when planting the front wheels, forward of the central planting unit, runs ahead of but in line with the center row of planted seed, but the rear tractor wheels, which are behind the planting units, must therefore run between the rows A of planted seed, and this is the position shown in Figure 1, the rear wheels being adjusted on the axle shafts 10 and 11 to secure this relation. However, when cultivating, a different situation arises. In cultivation the central cultivator tool can still be behind the front wheels because now the cultivating tools operate down the middles between the rows of plants. Therefore, there is no need to change the relation of the central tool when cultivating. However, the rear wheels of the tractor cannot remain in their relation to the tools that they occupy when planting, for the reason that since the tools now operate in the middles the rear wheels must also operate in paths running down the middle between the rows. In order to secure this arrangement, when cultivating, the rear wheels 13 and 14 are shifted inwardly, as by loosening the clamping means 15 and slipping the wheels laterally inwardly, each a distance equal to one-half the row spacing. This brings the rear wheels directly rearwardly in line with the inner one of each of the two laterally outer cultivating units, and hence the wheels clear the plant rows, which are indicated at B in Figure 2.

It will be noted that in changing the machine from planting to cultivating the only adjustment necessary, outside of changing the tools themselves, is to shift the tractor wheels; there is no need for changing the adjustment of the ground working tools or their supporting means, nor is there any need for changing the position of the draft transmitting bars or other supporting framework to which the tools are connected.

Another feature of this invention, of particular importance where a planting unit is utilized and is disposed directly rearwardly of the tractor front wheels in the center of the tractor, is the disposition of the central seed can at one side of the tractor and preferably at the side thereof adjacent the pulley 22. The latter member, by virtue of its lateral extension, offers some obstruction to the view of the operator at this side of the tractor, and the laterally inner seed can 131 is therefore disposed at this side of the tractor and preferably in a position in which the operator's view is not materially limited any further beyond what it is limited by the pulley 22. If, for example, the laterally inner seed can 131 were placed on the other side of the tractor, where the operator otherwise would have adequate vision, the seed can would obstruct the vision to a certain extent, which, with the pulley 22 on the right side, would result in the operator having restricted vision on both sides of the tractor, whereas by placing the can on the same side as the pulley, the vision on one side of the tractor is kept clear while the vision on the other is not materially restricted by the additional seed can supported at that side.

While I have shown and described above the preferred structure in which the principles of the present invention have been incorporated, it is to be understood that my invention is not to be limited to the specific details shown and described above, but that, in fact, widely different means may be employed in the practice of the broader aspects of my invention.

What I claim, therefore, and desire to secure by Letters Patent is:

1. A combined planter and cultivator adapted to be equipped with either planting or cultivating tools for either planting or cultivating row crops, comprising the combination with a tractor of the tricycle type having a centrally disposed front wheel means and adjustable rear wheels disposed laterally and having a lateral range of adjustment equal at least to one-half the distance between the crop rows, of a plurality of transversely aligned tool supporting means disposed between said front wheel means and said laterally adjustable rear wheels, one of said tool supporting means being disposed centrally behind said front wheel means, said remaining tool supporting means being disposed at equal distances from said central tool supporting means, irrespective of whether said tool supporting means receive planting tools or cultivator tools, the aforesaid range of adjustment providing for adjusting said rear wheels to a position substantially midway between the crop rows when said tool supporting means carry planting tools and to a position substantially directly behind said tool supporting means when the latter carry cultivating tools, whereby said tool supporting means may remain in the same position of lateral adjustment on the tractor, irrespective of whether they carry planting tools or cultivating tools.

2. The combination set forth in claim 1, further characterized by said transversely aligned tool supporting means being independently movable, one relative to the other and relative to the tractor.

3. The combination set forth in claim 1, further characterized by said tractor having two oppositely extending draft bars fixed rigidly to the tractor in transverse alignment and said centrally disposed tool supporting means being connected with both of said draft bars adjacent their inner ends.

4. The combination of claim 1, further characterized by said centrally disposed tool supporting means including two pairs of generally parallel links, one pair being disposed at one side of the tractor and the other being disposed at the other side of the tractor, and the other tool supporting means each including one pair of generally parallel links, whereby all of the tools supported by said tool supporting means are capable of independent floating movement relative to the tractor.

5. An agricultural implement comprising the combination with a tractor of the tricycle type having a centrally disposed front wheel means, laterally disposed rear wheels and transversely extending draft transmitting means, of a plurality of cultivating tools disposed between said front wheel means and said rear wheels and in transverse alignment, one of said cultivating tools being disposed substantially directly behind said front wheel means, the other cultivating tools being disposed laterally outwardly thereof. means for movably connecting the laterally outer cultivating tools with said draft transmitting means, comprising vertically swingable link means connected with said draft transmitting means and with said cultivating tools to provide for generally vertical floating movement of the latter, and means for movably connecting the centrally disposed cultivating tool with said draft transmitting means, comprising two sets of link means, one set being disposed at each side of the tractor and each being of substantially the same effective length as the link means for the laterally outer cultivating tools, means connecting each set of links to said draft transmitting means, and means connecting said sets of link means with said centrally disposed cultivating tool, the connecting link means for the laterally outer cultivating tools being connected with said draft transmitting means so as to dispose the associated cultivating tools in vertical longitudinal planes, in at least certain of which said rear tractor wheels are disposed.

6. An agricultural implement comprising the combination with a tractor of the tricycle type having a centrally disposed front wheel means, laterally disposed rear wheels and transversely extending draft transmitting means, of a plurality of planting tools disposed between said front wheel means and said rear wheels and in transverse alignment, one of said planting tools being disposed substantially directly behind said front wheel means, the other planting tools being disposed laterally outwardly thereof, means for movably connecting the laterally outer planting tools with said draft transmitting means, comprising vertically swingable link means connected with said draft transmitting means and with said planting tools to provide for generally vertical floating movement of the latter, and means for movably connecting the centrally disposed planting tool with said draft transmitting means, comprising two sets of link means, one set being disposed at each side of the tractor and each being of substantially the same effective length as the link means for the laterally outer planting tools, means connecting each set of links to said draft transmitting means, and means connecting said sets of link means with said centrally disposed planting tool, the connecting link means for the laterally outer planting tools being connected with said draft transmitting means so as to dispose the associated planting tools in vertical longitudinal planes substantially centrally between which said rear tractor wheels are disposed.

7. A combined planter and cultivator adapted to be equipped with either planting or cultivating tools and comprising the combination with a tractor of the tricycle type having a centrally disposed front wheel means, adjustable rear wheels having a lateral range of adjustment equivalent to half the distance between adjacent rows, and transverse draft transmitting bars fixed to the tractor, of a plurality of transversely aligned tool supporting means between said front wheel means and said rear wheels, one of said tool supporting means being disposed generally centrally behind said front wheel means and the other tool supporting means being disposed equal distances laterally of the centrally disposed tool supporting means, said tool supporting means being adapted to receive either planting tools or cultivating tools, separate link means movably connecting each of said laterally disposed tool supporting means with said draft transmitting bar means whereby said tool supporting means are movable independently of each other, a pair of link means disposed at each side of the tractor and connected with said transverse draft bar means and said central tool supporting means to provide for movement of the latter relative to the tractor and the other tool supporting means, all of said link means extending generally rearwardly of said draft transmitting bar means, and a marker unit including a marker element movable into and out of operative position and disposed when in operative position rearwardly of the planting tools supported by said tool supporting means and supporting means for said marker element movably connected between the latter and the adjacent end of the draft transmitting bar means, said marker unit being detachable from said bar means when the planting tools are replaced by cultivating tools.

8. A planter for planting an odd number of rows comprising the combination with the tractor of the tricycle type, having a central front wheel means and laterally spaced rear wheels, of an odd number of planting units, means connecting one of said units to the tractor substantially centrally thereof behind said front wheel means, means connecting the other planting units with said tractor with an equal number on opposite sides thereof and in transverse alignment with said central planting unit, said rear tractor wheels being disposed in longitudinal vertical planes spaced from the adjacent laterally disposed planting units so as to avoid passing over the seed deposited by the latter units.

9. In a planter for planting an odd number of rows, the combination with a tractor of the tricycle type having generally centrally disposed front wheel means, of a planting unit disposed substantially directly behind said front wheel means and underneath the tractor, and means at each side of the tractor operatively connected with said planting unit for raising and lowering the same.

10. An agricultural implement comprising the combination with a tractor having front wheel means and a pair of transverse tool bars fixed, respectively, to the sides of the tractor at their inner ends, of a plurality of tools including a center tool disposed substantially underneath the tractor behind said front wheel means, at least one laterally outer tool at each side of the tractor, means swingably connecting the center tool with the inner ends of both bars, and separate means respectively connecting said laterally outer tools with said tool bars.

11. In a planter for planting an odd number of rows, the combination with a tractor of the tricycle type having generally centrally disposed front wheel means, of a planting unit disposed substantially directly behind said front wheel means and underneath the tractor, means at each side of the tractor operatively connected with said planting unit for raising and lowering the same, and a seed can and seed selecting mechanism for said planting unit carried by the tractor closely adjacent one side thereof.

12. In a planter for planting an odd number of rows, the combination with a tractor of the tricycle type having generally centrally disposed front wheel means and a pulley at one side of the tractor, of a planting unit disposed substantially directly behind said front wheel means and underneath the tractor, means at each side of the tractor operatively connected with said planting unit for raising and lowering the same, and a seed can and seed selecting mechanism for said planting unit carried by the tractor closely adjacent said one side thereof and forward of said pulley.

13. An agricultural implement comprising the combination with a tractor having front wheel means and a pair of transverse tool bars, of a plurality of tools including a center tool disposed substantially underneath the tractor behind said front wheel means, at least one laterally outer tool at each side of the tractor, two sets of parallel link means connecting the center tool with the inner ends of said tool bars, and a set of parallel links connecting each of the laterally outer tools with the associated tool bar, said sets of parallel links providing for separate movement of each tool relative to the others.

14. An agricultural implement comprising the combination with a tractor having front wheel means and a pair of transverse tool bars, of a plurality of tools including a center tool disposed substantially underneath the tractor behind said front wheel means, at least one laterally outer tool at each side of the tractor, a cross bar to which said center tool is fixed, a pair of brackets one connected to each outer end of said cross bar, two pairs of generally downwardly and rearwardly extending parallel links, each pair connected at their rear ends with the associated bracket and at their forward ends with the inner end of the associated tool bar, and a set of generally downwardly and rearwardly extending parallel links connecting each of the laterally outer tools with the associated tool bar.

THEODORE W. JOHNSON.